(12) United States Patent
Chelle et al.

(10) Patent No.: US 11,781,014 B2
(45) Date of Patent: Oct. 10, 2023

(54) POLYAMIDE HOT-MELT RESIN GRANULES LOADED WITH ACTIVE INGREDIENTS

(71) Applicant: AB7 INOVATION S.A.S.U, Deyme (FR)

(72) Inventors: René Chelle, Deyme (FR); David Nguyen, Toulouse (FR); Arnaud Vilbert, Baziége (FR)

(73) Assignee: AB7 INNOVATION S.A.S.U.

( * ) Notice: Subject to any disclaimer, the term of this patent is extended or adjusted under 35 U.S.C. 154(b) by 62 days.

(21) Appl. No.: 17/369,258

(22) Filed: Jul. 7, 2021

(65) Prior Publication Data

US 2021/0332241 A1    Oct. 28, 2021

Related U.S. Application Data

(63) Continuation of application No. 16/221,053, filed on Dec. 14, 2018, now Pat. No. 11,084,926.

(60) Provisional application No. 62/608,994, filed on Dec. 21, 2017.

(51) Int. Cl.
| | |
|---|---|
| *C08L 77/06* | (2006.01) |
| *C08K 5/092* | (2006.01) |
| *C08K 5/20* | (2006.01) |
| *C08K 5/00* | (2006.01) |
| *A01N 25/10* | (2006.01) |
| *C08K 5/3432* | (2006.01) |
| *C08K 5/49* | (2006.01) |
| *C08G 69/34* | (2006.01) |
| *C09J 177/08* | (2006.01) |
| *C08K 5/02* | (2006.01) |
| *C08L 77/08* | (2006.01) |
| *C08K 11/00* | (2006.01) |

(52) U.S. Cl.
CPC .............. *C08L 77/06* (2013.01); *A01N 25/10* (2013.01); *C08G 69/34* (2013.01); *C08K 5/0008* (2013.01); *C08K 5/0058* (2013.01); *C08K 5/02* (2013.01); *C08K 5/092* (2013.01); *C08K 5/20* (2013.01); *C08K 5/3432* (2013.01); *C08K 5/49* (2013.01); *C08K 11/00* (2013.01); *C08L 77/08* (2013.01); *C09J 177/08* (2013.01)

(58) Field of Classification Search
CPC ... C08L 77/06–08; A01N 25/08; A01N 25/10; C08G 69/34; C08K 5/0058; C08K 9/10; C08K 9/12; C08J 177/08
See application file for complete search history.

(56) References Cited

U.S. PATENT DOCUMENTS

| | | | |
|---|---|---|---|
| 3,449,273 A | 6/1969 | Kettenring et al. | |
| 4,184,099 A | 1/1980 | Lindauer et al. | |
| 4,419,494 A | 12/1983 | Puletti et al. | |
| 4,560,579 A | 12/1985 | Siadat et al. | |
| 5,883,172 A | 3/1999 | Heucher et al. | |
| 2005/0134664 A1 | 6/2005 | Pavlin | |
| 2015/0073093 A1 | 3/2015 | Isobe | |

FOREIGN PATENT DOCUMENTS

| | | |
|---|---|---|
| EP | 0307551 A2 * | 3/1989 |
| EP | 1027032 | 8/2000 |
| FR | 223380 | 1/1975 |
| FR | 2941972 | 8/2010 |

* cited by examiner

*Primary Examiner* — Ana L. Woodward
(74) *Attorney, Agent, or Firm* — McDonnell Boehnen Hulbert & Berghoff LLP

(57) ABSTRACT

The present document describes a polyamide hot-melt resin having a chemical structure consisting of dimerized fatty acids and diamines, loaded with an active ingredient. The dimerized fatty acids may have 12 to 24 carbons and the diamines may have 2 to 14 carbons. The amine residual functional groups and acid residual functional groups within the polyamide hot-melt resin may have a [NH$_2$]/[COOH] molar ratio below 5, and the active ingredient may be incorporated in quantities of between about 0.01 and about 55% by weight of weight of the resin. The present document also describes items molded from the polyamide hot-melt resins, and processes of preparing the polyamide hot-melt resins.

13 Claims, 1 Drawing Sheet

POLYAMIDE HOT-MELT RESIN GRANULES LOADED WITH ACTIVE INGREDIENTS

CROSS-REFERENCE TO RELATED APPLICATIONS

This application is filed as a continuation application. This application claims priority under 35 USC § 120 of U.S. patent application Ser. No. 16/221,053 filed Dec. 14, 2018, which claims the benefit and priority of U.S. provisional patent application No. 62/608,994 filed on Dec. 21, 2017, the specifications of which are hereby incorporated by reference in their entireties.

BACKGROUND

(a) Field

The present invention relates to the field of solid polymer material incorporating a liquid solution of active ingredient. Specifically, the present invention relates to a plurality of polyamide hot-melt resin granules containing an active ingredient.

(b) Related Prior Art

The use of polyamide hot-melt adhesive resins is known, either directly as glue or as one of the constituents of adhesive compositions. In such compositions, they are mixed with other polymers, specifically polyolefin such as copolymers of ethylene and vinyl acetate, acrylics, styrenics, polyurethanes. For example, US patent application publication No. US2015/0073093 describes the use of a particular grade of polyamide hot-melt resins as a constituent of a composite polymer with great adhesive strength. The chemical properties of the different constituents of an adhesive composition determine the nature of the different materials (e.g. metals, plastics, papers, etc.) to which it adheres.

The use of polyamide hot-melt adhesive resins as a gelling agent is also known. Indeed, European patent EP1027032 describes the use of a polyamide hot-melt resin in a gel containing limonene intended for air purification. This specific category of polyamide resin is also used in compositions of paint or ink (see US patent application No. US2005/134664).

In other compositions, such as in French patent No. FR2233380, it is disclosed polymer supports of a thermoplastic polyamide type loaded with a volatile active ingredient to combat arthropod pests. In French patent No. FR2941972, microparticles of thermoplastic polyamides (PA) of the family of PA6, PA11, PA12, etc., loaded with active ingredient are proposed. But the above-mentioned thermoplastic polyamides are fundamentally different as regards their chemical structure compared to polyamide hot-melt resins on which are based the invention.

In the above-mentioned polyamide hot-melt resins, not all are capable of serving satisfactorily as a support for the incorporation of a lipophilic solution containing at least one active ingredient in significant quantity.

The polyamide hot-melt resins that are suitable for the desired aim contain amine and/or carboxyl type residual functional groups. They can be obtained in different ways, specifically by polycondensation reactions between acids and amines.

It has been observed that a certain category of polyamide resins belonging to the family of hot-melt adhesive resins can serve as a solid support capable of incorporating a lipophilic solution of active ingredient in significant quantity. Moreover, these polyamide hot-melt adhesive resins, once loaded with active ingredient, have the additional advantage of being capable of being shaped by common plastics processing techniques namely, specifically, injection molding, extrusion, hot-pressing and coating in order to obtain items loaded with active ingredient.

Furthermore, it has been observed that many polyamide hot-melt resins have a liquid incorporation capacity below 10% by weight and to a lesser degree below 15% by weight. Now, it is advantageous to be able to incorporate a quantity of liquid exceeding 20% by weight of the polymer so as to have control of the dose of diffused active ingredient, the duration of diffusion and to limit any risks of sequestration of certain active ingredients that can be found in this family of polymers.

A need therefore exists to provide polyamide hot-melt resin granules capable, of incorporating a significant quantity of active ingredient solution.

Furthermore, a need exists to provide polyamide hot-melt resin granules thus loaded with active ingredient that may be shaped to obtain items that also contain the active ingredient.

In the present invention, the inventors have identified a category of polyamide hot-melt resins that suitable for use as a support for the incorporation of active ingredient in liquid form and that may be formed into useful items.

SUMMARY

According to an embodiment, there is provide a polyamide hot-melt resin having a chemical structure consisting of dimerized fatty acids and diamines, the polyamide hot-melt resin being loaded with an active ingredient, wherein the dimerized fatty acids have 12 to 24 carbons and the diamines have 2 to 14 carbons, wherein amine residual functional groups and acid residual functional groups within the polyamide hot-melt resin have a [$NH_2$]/[COOH] molar ratio below 5, and wherein the polyamide hot-melt resin incorporates an active ingredient in quantities of between about 0.01 and about 55% by weight of weight of the resin.

The polyamide hot-melt resins may incorporate an active ingredient in quantities of between about 1 and about 50, or about 5 and about 50%, or about 10 and about 45%, or about 15 and about 45%, or about 20 and about 45% by weight of weight of the resin.

The [$NH_2$]/[COOH] molar ratio of the residual functional groups may be below 2.

The [$NH_2$]/[COOH] molar ratio of the residual functional groups may be below 1.

The acid residual functional group content of the polyamide hot-melt resins may exceed 2 mg of KOH/g of resin granules.

The amine residual functional group content of the polyamide hot-melt resins may be below 5 mg of KOH/g of resin granules.

The softening temperature of the resins may be between about 145 and about 200° C.

The softening temperature of the resins may be between about 150 and about 190° C.

The dimerized acid may contain a monocarboxylic, a dicarboxylic or a multicarboxylic acid.

The dimerized acid may be obtained by a polymerization reaction between an unsaturated fatty acid, namely oleic acid, linoleic acid, a dry or semi-dry fatty acid, and a monoalcohol ester with a low molecular weight derived from these fatty acids.

The diamines may be chosen from the group consisting of ethylenediamine, triethylenediamine, tetraethylenediamine, hexamethylenediamine, p- or m-xylenediamine, 4,4'-methylene bis(cydohexylamine), 2,2-bis(4-cyclohexylamine), polyetherdiamine, isophoronediamine, 1,2- 1,3-, 1,4-cyclohexanediamine, 1,4-bis(2'-aminoethyl)benzene, piperazine, 1,3-di-4-piperidylpropane, and dimerized amines having amine functions from the conversion of the carboxyl group of the above dimerized acids.

The active ingredient may be chosen from an insecticide, an insect repellent, a microbicide, an attractant, a pheromone, a hormone, a vitamin, a perfume, an essential oil, a drug, a plant extract, or a mixture thereof.

The insecticide and the insect repellent are selected from the group consisting of pyrethroids, pyrethrines, carbamates, formamidines, carboxylic esters, N,N-diethyl-3-methylbenzamide (DEET), phenylpyrazoles, organophosphorus compounds, organohalogen compounds, neonicotinoids, avermectines, ivermectine, abamectine, doramectine, spinosyns, essential oils, terpenes, alcohol derivatives of terpenes, ester derivatives of terpenes, aldehyde derivatives of terpenes, sesquiterpenes, alcohol derivatives of sesquiterpenes, ester derivatives of sesquiterpenes, aldehyde derivatives of sesquiterpenes.

According to another embodiment, there is provide a molded item made from a plurality of polyamide hot-melt resin granules according to the present invention, the item having been molded by injection-molding, blow-molding, extrusion, hot-pressing or coating.

The acid residual functional group content of the polyamide hot-melt resins may exceed 2 mg of KOH/g of resin granules, and the amine residual functional group content of the polyamide hot-melt resins may be below 5 mg of KOH/g of resin granules.

The active ingredient may be chosen from an insecticide, an insect repellent, a microbicide, an attractant, a pheromone, a hormone, a vitamin, a perfume, an essential oil, a drug, a plant extract, or a mixture thereof.

According to another embodiment, there is provide a molded item made from a plurality of polyamide hot-melt resin granules synthesized from dimerized fatty acids having 12 to 24 carbons and diamines having 2 to 14 carbons, the resins granules being loaded with active ingredient, wherein the polyamide hot-melt resin granules have amine residual functional groups and acid residual functional groups in a [NH$_2$]/[COOH] molar ratio below 5 and in a quantity of the active ingredient between 0.01 and 55% by weight compared to the total weight of the molded item, the item having been molded by injection-molding, blow-molding, extrusion, hot-pressing or coating.

The acid residual functional group content of the polyamide hot-melt resins may exceed 2 mg of KOH/g of resin granules, and the amine residual functional group content of the polyamide hot-melt resins may be below 5 mg of KOH/g of resin granules.

The active ingredient may be chosen from an insecticide, an insect repellent, a microbicide, an attractant, a pheromone, a hormone, a vitamin, a perfume, an essential oil, a drug, a plant extract, or a mixture thereof.

According to another embodiment, there is provide a method for obtaining polyamide hot-melt resin granules loaded with active ingredient in liquid solution, and having a chemical structure consisting of dimerized fatty acids having 12 to 24 carbons and diamines having 2 to 14 carbons, the method comprising the steps of:
  a) heating a polyamide hot-melt resin granule consisting of dimerized fatty acids having 12 et 24 carbons and diamines having 2 to 14 carbons, having amine and acid residual functional groups whose [NH$_2$]/[COOH] molar ratio may be below 5 and having a softening temperature of between 145 and 200° C., to between about 30 and about 95° C.;
  b) mixing a liquid solution of the active ingredient onto the polyamide hot-melt resin granules heated in step b), to obtain a polyamide hot-melt resin granule loaded with active ingredient.

The [NH$_2$]/[COOH] molar ratio of the residual functional groups may be below 2.

The [NH$_2$]/[COOH] molar ratio of the residual functional groups may be below 1.

The acid residual functional group content of the resins granules may exceed 2 mg of KOH/g of resin granules.

The amine residual functional group content of the resins granules may be below 5 mg of KOH/g of resin granules.

The softening temperature of the resins may be between about 150 and about 190° C.

The active ingredient may be chosen from an insecticide, an insect repellent, a microbicide, an attractant, a pheromone, a hormone, a vitamin, a perfume, an essential oil, a drug, a plant extract, or a mixture thereof.

The insecticide and the insect repellent are selected from the group consisting of pyrethroids, pyrethrines, carbamates, formamidines, carboxylic esters, N,N-diethyl-3-methylbenzamide (DEET), phenylpyrazoles, organophosphorus compounds, organohalogen compounds, neonicotinoids, avermectines, ivermectine, abamectine, doramectine spinosyns, essential oils, terpenes, alcohol derivatives of terpenes, ester derivatives of terpenes, aldehyde derivatives of terpenes, sesquiterpenes, alcohol derivatives of sesquiterpenes, ester derivatives of sesquiterpenes, aldehyde derivatives of sesquiterpenes.According to another embodiment, there is provide a use of the polyamide hot-melt resin granules according to the present invention as a solid support incorporating between 0.01 and 55% by weight of a liquid solution containing an active ingredient having biocide, well-being and cosmetic, therapeutic, and phytosanitary effects or a mixture thereof.

The following terms are defined below.

The term "active ingredient" is intended to mean, in the context of the present invention, one active molecule or a combination of active molecules. The active ingredient can be in liquid form or in solid or viscous form but made liquid by solubilization, by heating or any other known means, depending on its chemical nature. Examples of active molecules are provided below. In the context of the invention, the liquid solution of active ingredient means that the latter constitutes all of the liquid or that the active ingredient as defined above is formulated with solvents and/or formulation vectors.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
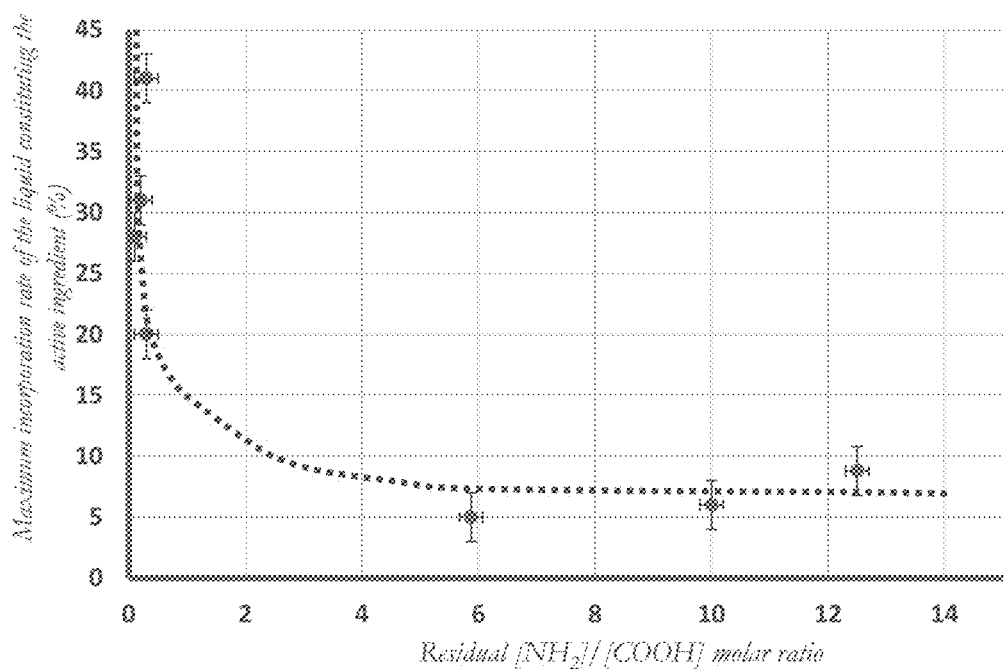
FIG. 1 illustrates the influence of the [NH$_2$/COOH] molar ratio of residual functional groups on the capacity of a polyamide hot-melt resins according to the present invention to incorporate liquid.

The present invention is directed to polyamide hot-melt resins whose chemical structure consists of dimerized fatty acids and diamines, loaded with a liquid solution of active ingredient. In the context of the invention, the liquid solution of active ingredient means that the latter constitutes all of the liquid or that the active ingredient as defined above is formulated with solvents and/or formulation vectors.

In embodiments, there is disclosed polyamide hot-melt resins whose chemical structure consists of dimerized fatty acids and diamines. In embodiments, the resins are loaded with an active ingredient, and the dimerized fatty acids have 12 to 24 carbons and the diamines have 2 to 14 carbons, the amine and acid residual functional groups within the resins have a [$NH_2$]/[COOH] molar ratio below 5, and the resins incorporate an active ingredient in quantities of between about 0.01 and about 55%, or from about 0.1 and 55%, or from about 1 and 55%, or from about 5 and 55%, or from about 10 and 55%, or from about 15 and 55%, or from about 20 and 55%, or from about 25 and 55%, or from about 30 and 55%, or from about 35 and 55%, or from about 40 and 55%, or from about 45 and 55%, or from about 50 and 55%, or from about 0.01 and about 50%, or from about 0.1 and 50%, or from about 1 and 50%, or from about 5 and 50%, or from about 10 and 50%, or from about 15 and 50%, or from about 20 and 50%, or from about 25 and 50%, or from about 30 and 50%, or from about 35 and 50%, or from about 40 and 50%, or from about 45 and 50%, or from about 0.01 and about 45%, or from about 0.1 and 45%, or from about 1 and 45%, or from about 5 and 45%, or from about 10 and 45%, or from about 15 and 45%, or from about 20 and 45%, or from about 25 and 45%, or from about 30 and 45%, or from about 35 and 45%, or from about 40 and 45%, or from about 0.01 and about 40%, or from about 0.1 and 40%, or from about 1 and 40%, or from about 5 and 40%, or from about 10 and 40%, or from about 15 and 40%, or from about 20 and 40%, or from about 25 and 40%, or from about 30 and 40%, or from about 35 and 40%, or from about 0.01 and about 35%, or from about 0.1 and 35%, or from about 1 and 35%, or from about 5 and 35%, or from about 10 and 35%, or from about 15 and 35%, or from about 20 and 35%, or from about 25 and 35%, or from about 30 and 35%, or from about 0.01 and about 30%, or from about 0.1 and 30%, or from about 1 and 30%, or from about 5 and 30%, or from about 10 and 30%, or from about 15 and 30%, or from about 20 and 30%, or from about 25 and 30%, or from about 0.01 and about 25%, or from about 0.1 and 25%, or from about 1 and 25%, or from about 5 and 25%, or from about 10 and 25%, or from about 15 and 25%, or from about 20 and 25%, or from about 0.01 and about 20%, or from about 0.1 and 20%, or from about 1 and 20%, or from about 5 and 20%, or from about 10 and 20%, or from about 15and 20%, or from about 0.01 and about 15%, or from about 0.1 and 15%, or from about 1 and 15%, or from about 5 and 15%, or from about 10 and 15%, or from about 0.01 and about 10%, or from about 0.1 and 10%, or from about 1 and 10%, or from about 5 and 10%, or from about 0.01 and about 5%, or from about 0.1 and 5%, or from about 1 and 5%, or from about 0.01 and about 1%, or from about 0.1 and 1%, or from about 0.01 and about 0.1%, or 0.01%, 0.1%, 1%, 5%, 10%, 15%, 20%, 25%, 30%, 35%, 40%, 45%, 50%, 55% by weight of their weight. Preferably, the resins incorporate an active ingredient in quantities of between about 1 and about 50%, or between about 5 and about 50%, or between about 10 and about 45%, or between about 15 and about 45%, or between about 20 and about 45%by weight.

According to a preferred embodiment, the [$NH_2$]/[COOH] molar ratio of the residual functional groups of the resins is below 2, and most preferably below 1.

According to an embodiment, the acid residual functional group content of the polyamide hot-melt resins exceeds 2 mg of KOH/g of resin granules.

According to another embodiment, the amine residual functional group content of the polyamide hot-melt resins is less than 5 mg of KOH/g of resin granules.

According to another embodiment, the softening temperature of the polyamide hot-melt resins is between about 145 and about 200° C., or from about 150 and about 200° C., or from about 155 and about 200° C., or from about 160 and about 200° C., or from about 165 and about 200° C., or from about 170 and about 200° C., or from about 175 and about 200° C., or from about 180 and about 200° C., or from about 185 and about 200° C., or from about 190 and about 200° C., or from about 195 and about 200° C., or about 145 and about 195° C., or from about 150 and about 195° C., or from about 155 and about 195° C., or from about 160 and about 195° C., or from about 165 and about 195° C., or from about 170 and about 195° C., or from about 175 and about 195° C., or from about 180 and about 195° C., or from about 185 and about 195° C., or from about 190 and about 195° C., or about 145 and about 190° C., or from about 150 and about 190° C., or from about 155 and about 190° C., or from about 160 and about 190° C., or from about 165 and about 190° C., or from about 170 and about 190° C., or from about 175 and about 190° C., or from about 180 and about 190° C., or from about 185 and about 190° C., or about 145 and about 185° C., or from about 150 and about 185° C., or from about 155 and about 185° C., or from about 160 and about 185° C., or from about 165 and about 185° C., or from about 170 and about 185° C., or from about 175 and about 185° C., or from about 180 and about 185° C., or about 145 and about 180° C., or from about 150 and about 180° C., or from about 155 and about 180° C., or from about 160 and about 180° C., or from about 165 and about 180° C., or from about 170 and about 180° C., or from about 175 and about 180° C., or about 145 and about 175° C., or from about 150 and about 175° C., or from about 155 and about 175° C., or from about 160 and about 175° C., or from about 165 and about 175° C., or from about 170 and about 175° C., or about 145 and about 170° C., or from about 150 and about 170° C., or from about 155 and about 170° C., or from about 160 and about 170° C., or from about 165 and about 170° C., or about 145 and about 165° C., or from about 150 and about 165° C., or from about 155 and about 165° C., or from about 160 and about 165° C., or about 145 and about 160° C., or from about 150 and about 160° C., or from about 155 and about 160° C., or about 145 and about 155° C., or from about 150 and about 155° C., or about 145 and about 150° C., or 145° C., 150° C., 155° C., 160° C., 165° C., 170° C., 175° C., 180° C., 185° C., 190° C., 195° C., 200° C., and preferably from about 150 to about 190° C.

In embodiments, to obtain the polyamide hot-melt resins suitable for the present invention requires a multi-step synthesis reaction which involves a step of extraction of vegetable oils. Suitable oils include without limitations tall oil, soya oil, maize oil, rice bran oil and sunflower oil, from which unsaturated fatty acids are extracted by different known methods such as extraction with organic solvents (e.g. hexane) which provides solid/liquid or liquid/liquid extraction, followed by distillation to remove residual solvent. This is followed by a dimerization step to obtain a complex mixture of diacids and, lastly, a polycondensation step with a mixture of diamines. Advantageously, the product obtained is a solid in the form of granules with an average particle size between about 2 and about 5 mm, or from about 2 to about 4 mm, or from about 2 to about 3 mm, or from about 3 to about 5 mm, or from about 3 to about 4 mm, or from about 4 to about 5 mm. Therefore, the dimerized fatty acids are synthesized from unsaturated fatty acids extracted from the vegetable oils.

In embodiments, the initial diacid and diamine content, the choice of their chemical nature, as well as the mono or polyacids (or amines) added at the time of polymerization will affect the physico-chemical properties of the polyamide hot-melt resins finally obtained. Specifically, the softening temperature can vary from 145 and about 200° C., preferably 150 to 190° C., as indicated above. By the nature of the synthetic route used to synthesize the polyamide hot-melt resins, residual acidic functional groups, specifically carboxylic acids or amine exist within the granules obtained. In a known way, their content can be titrated and is expressed in mg of KOH per gram of polyamide resin granules.

The titration methods involve dissolving polyamide hot-melt resins in propanol with the aid of reagents such as phenolphthalein or bromophenol. It is known that when resins have comparable amine and residual acid function contents, they are broadly neutral. In all other cases, they are more or less acidic or basic depending on the quantity of one or the other of these two residual functional groups.

In embodiments, the acid component formed by $C_{12}$-$C_{24}$ dimerized acid may contain a monocarboxylic, a dicarboxylic or a multi carboxylic acid. The dimerized acid can be obtained by a polymerization reaction between an unsaturated fatty acid, such as oleic acid, linoleic acid, a dry or semi-dry fatty acid, and a mono alcohol ester with a low molecular weight derived from these fatty acids. Occasionally, in order to reduce the degree of unsaturation of the dimerized acid, fatty acids can be hydrogenated before or after fractionation.

According to an embodiment, the monocarboxylic acids may be chosen from acetic acid, propionic acid, benzoic acid, lauric acid, oleic acid, stearic acid, tall oil fatty acid, cyclohexane carboxylic acid and 1-adamantanecarboxylic acid. These acids can be used alone or in combination with each other. According to some embodiments, these monocarboxylic acids may be obtained specifically from plant extracts as well as from black liquors produced by the paper industry.

According to an embodiment, the dicarboxylic acids may be chosen from oxalic acid, malonic acid, succinic acid, glutaric acid, adipic acid, maleic acid, furamic acid, phthalic acid, terephthalic acid, 1,3- or 1,4--cyclohexanedicarboxylic acid, 1,3-adamantanedicarboxylic acid, pimelic acid, suberic acid, azelaic acid, sebacic acid, nonamethylendicarboxylic acid, decamethylenedicarboxylic acid, undecamethylenedicarboxylic acid, dodecamethylenedicarboxylic acid, tridecamethylenedicarboxylic acid, tetradecamethylenedicarboxylic acid, pentadecametyledicarboxylic acid andhexadecamethylenedicarboxylic acid. These acids can be used alone or in combination.

The multicarboxylic acids are chosen from 1,2,4-benzenetricarboxylic acid, 2,5,7-naphthalenetricarboxylic acid, 1,2,4-naphthalenetricarboxylic acid, 1,2,4-butan tricarboxylic acid, 1,2,5-hexanetricarboxylic acid, 1,2,4-cydohexanetricarboxylic acid, tetra(methylenecarboxyl)methane acid, 1,2,7,8-octanetetracarboxylic acid and pyromellitic acid. These acids can be used alone or in combination with each other.

According to an embodiment, the diamines may be chosen from the group consisting of by ethylenediamine, triethylenediarnine, tetraethylenediamine, hexamethylenediamine, p- or m-xylenediamine, 4,4'-methylene bis (cydohexylamine), 2,2-bis(4-cyclohexylamine), polyetherdiamine, isophoronediamine, 1,2- 1,3-, or 1,4-cyclohexanediamine, 1,4-bis(2'-aminoethyl)benzene, piperazine, 1,3-di-4-piperidylpropane, as well as dimerized amines having amine functions from the conversion of the carboxyl group of the above dimerized acids. These diamines can be used alone or in combination with each other.

According to another embodiment, the polyimide hot-melt resin granules according to the present invention may therefore be obtained from a complex mixture of dimerized fatty acids and polyamines.

In embodiments of the present invention, an active ingredient is incorporated with the granules. According to an embodiment, the active ingredient may be of natural origin or synthetic origin. According to another embodiment, the active ingredient may have biocidal, well-being, cosmetic, therapeutic, phytosanitary effects or properties or a mixture thereof.

According to an embodiment, the active ingredient may be a biocide chosen from an insecticide, an insect repellent, a microbicide (a bactericide, a fungicide, a virucide). According to another embodiment, the active ingredient may be selected from an attractant, a pheromone, a hormone, a vitamin, a perfume, an essential oil, a drug, a plant extract or a mixture thereof.

According to an embodiment, active ingredients with a cosmetic effect, pharmaceutical active ingredients and active ingredients with a phytosanitary effect can be formed by the combination of several active molecules.

The insecticides and insect repellents according to the present invention may be in liquid, viscous, or solid form. They may be specifically chosen from the group comprising pyrethroids [e.g. permethrin, deltamethrine, cypermethrine, tetramethrin), pyrethrins and their derivatives, carbamates, formamidines (e.g. amitraz), carboxylic esters (e.g. IR3535), N,N-diethyl-3-methylbenzamide (DEET), phenylpyrazoles (e.g. Fipronil), organophosphorus compounds, organohalogen compounds, neonicotinoids, avermectines and their derivatives, spinosyns, essential oils and their components (examples: terpenes and their derivatives (alcohols, esters, aldehydes) and sesquiterpenes and their derivatives (alcohols, esters, aldehydes)].

According to an embodiment, the active ingredient in liquid form may be incorporated as such, or it may be formulated with well-known vectors such as a vegetable oil, a mineral oil, a solvent, a surfactant, a plasticizer or a combination thereof. According to an embodiment, the vector may be chosen from the group of carbonates (e.g. propylene carbonates, polypropylene carbonates, glycerin carbonates), esters (e.g. dimethyl isosorbide, dimethyl succinate, dimethylglutarate, dimethyl adipate, diisobutyl succinate, diisobutylglutarate, diisobutyladipate, butylphtalate, diisodecylphtalate, dibutylephtalate, methylglycolphtalate, benzylbutylephtalate), ethers (e.g. ipropyleneglycolmethyl ether, propyleneglycol ether), fatty alcohols (e.g. glycerol and derivatives thereof, propylene glycol, polypropylene glycol, polyethylene glycol, polypropylene oxide glycol), vegetable oils, mineral oils or a mixture thereof.

According to another embodiment, the liquid that comprises the active ingredient(s) can also contain formulation additives such as colorings, anti-UV agents (e.g. benzophenone, benzotriazole, tris(tetramethylhydroxypiperidinol)citrate, octisalate, ethylhexylsalicylate, butyl methoxydibenzoylmethane, diethylhexylsyringylidenemalonate, 2-hydroxy-4-methoxy-benzophenone), etc.

According to a second object of the present invention, there is disclosed a method for obtaining a plurality of polyamide hot-melt resin granules that have a chemical structure consisting of dimerized fatty acids having 12 to 24 carbons and diamines having 2 to 14 carbons, the granules being loaded with an active ingredient in liquid solution, wherein the method comprises the steps of:
  a. heating a polyamide hot-melt resin granule consisting of dimerized fatty acids having 12 et 24 carbons and diamines having 2 to 14 carbons, having amine and acid residual functional groups whose [NH$_2$]/[COOH] molar ratio is below 5 and having a softening temperature of between 145 and 200° C., to between about 30 and about 95° C.;
  b. mixing a liquid solution of the active ingredient onto the polyamide hot-melt resin granule heated in step b), to obtain a polyamide hot-melt resin granule loaded with active ingredient.

According to embodiments, the softening temperature of the polyamide hot-melt resins is between about 145 and about 200° C., or from about 150 and about 200° C., or from about 155 and about 200° C., or from about 160 and about 200° C., or from about 165 and about 200° C., or from about 170 and about 200° C., or from about 175 and about 200° C., or from about 180 and about 200° C., or from about 185 and about 200° C., or from about 190 and about 200° C., or from about 195 and about 200° C., or about 145 and about 195° C., or from about 150 and about 195° C., or from about 155 and about 195° C., or from about 160 and about 195° C., or from about 165 and about 195° C., or from about 170 and about 195° C., or from about 175 and about 195° C., or from about 180 and about 195° C., or from about 185 and about 195° C., or from about 190 and about 195° C., or about 145 and about 190° C., or from about 150 and about 190° C., or from about 155 and about 190° C., or from about 160 and about 190° C., or from about 165 and about 190° C., or from about 170 and about 190° C., or from about 175 and about 190° C., or from about 180 and about 190° C., or from about 185 and about 190° C., or about 145 and about 185° C., or from about 150 and about 185° C., or from about 155 and about 185° C., or from about 160 and about 185° C., or from about 165 and about 185° C., or from about 170 and about 185° C., or from about 175 and about 185° C., or from about 180 and about 185° C., or about 145 and about 180° C., or from about 150 and about 180° C., or from about 155 and about 180° C., or from about 160 and about 180° C., or from about 165 and about 180° C., or from about 170 and about 180° C., or from about 175 and about 180° C., or about 145 and about 175° C., or from about 150 and about 175° C., or from about 155 and about 175° C., or from about 160 and about 175° C., or from about 165 and about 175° C., or from about 170 and about 175° C., or about 145 and about 170° C., or from about 150 and about 170° C., or from about 155 and about 170° C., or from about 160 and about 170° C., or from about 165 and about 170° C., or about 145 and about 165° C., or from about 150 and about 165° C., or from about 155 and about 165° C., or from about 160 and about 165° C., or about 145 and about 160° C., or from about 150 and about 160° C., or from about 155 and about 160° C., or about 145 and about 155° C., or from about 150 and about 155° C., or about 145 and about 150° C., or 145° C., 150° C., 155° C., 160° C., 165° C., 170° C., 175° C., 180° C., 185° C., 190° C., 195° C., 200° C., and preferably from about 150 to about 190° C.

In embodiments, the heating of the polyamide hot-melt resin granule may be performed at from about 30 to about 95° C., or from about 35 to about 95° C., or from about 40 to about 95° C., or from about 45 to about 95° C., or from about 50 to about 95° C., or from about 55 to about 95° C., or from about 60 to about 95° C., or from about 65 to about 95° C., or from about 70 to about 95° C., or from about 75 to about 95° C., or from about 80 to about 95° C., or from about 85 to about 95° C., or from about 90 to about 95° C., or from about 30 to about 90° C., or from about 35 to about 90° C., or from about 40 to about 90° C., or from about 45 to about 90° C., or from about 50 to about 90° C., or from about 55 to about 90° C., or from about 60 to about 90° C., or from about 65 to about 90° C., or from about 70 to about 90° C., or from about 75 to about 90° C., or from about 80 to about 90° C., or from about 85 to about 90° C., or from about 30 to about 85° C., or from about 35 to about 85° C., or from about 40 to about 85° C., or from about 45 to about 85° C., or from about 50 to about 85° C., or from about 55 to about 85° C., or from about 60 to about 85° C., or from about 65 to about 85° C., or from about 70 to about 85° C., or from about 75 to about 85° C., or from about 80 to about 85° C., or from about 30 to about 80° C., or from about 35 to about 80° C., or from about 40 to about 80° C., or from about 45 to about 80° C., or from about 50 to about 80° C., or from about 55 to about 80° C., or from about 60 to about 80° C., or from about 65 to about 80° C., or from about 70 to about 80° C., or from about 75 to about 80° C., or from about 30 to about 75° C., or from about 35 to about 75° C., or from about 40 to about 75° C., or from about 45 to about 75° C., or from about 50 to about 75° C., or from about 55 to about 75° C., or from about 60 to about 75° C., or from about 65 to about 75° C., or from about 70 to about 75° C., or from about 30 to about 70° C., or from about 35 to about 70° C., or from about 40 to about 70° C., or from about 45 to about 70° C., or from about 50 to about 70° C., or from about 55 to about 70° C., or from about 60 to about 70° C., or from about 65 to about 70° C., or from about 30 to about 65° C., or from about 35 to about 65° C., or from about 40 to about 65° C., or from about 45 to about 65° C., or from about 50 to about 65° C., or from about 55 to about 65° C., or from about 60 to about 65° C., or from about 30 to about 60° C., or from about 35 to about 60° C., or from about 40 to about 60° C., or from about 45 to about 60° C., or from about 50 to about 60° C., or from about 55 to about 60° C., or from about 30 to about 55° C., or from about 35 to about 55° C., or from about 40 to about 55° C., or from about 45 to about 55° C., or from about 50 to about 55° C., or from about 30 to about 50° C., or from about 35 to about 50° C., or from about 40 to about 50° C., or from about 45 to about 50° C., or from about 30 to about 45° C., or from about 35 to about 45° C., or from about 40 to about 45° C., or from about 30 to about 40° C., or from about 35 to about 40° C., or from about 30 to about 35° C., or 30° C., 35° C., 40° C., 45° C., 50° C., 55° C., 60° C., 65° C., 70° C., 75° C., 80° C., 85° C., 90° C. and 95° C.

Surprisingly, the inventors observed that the higher the content of acid residual functional groups, the better the liquid-solution incorporation capacity of the polyamide hot-melt resins.

According to a preferred embodiment, the [NH$_2$]/[COOH] molar ratio of the residual functional groups is below 2, preferably below 1.

According to an embodiment, the acid residual functional group content of the polyamide hot-melt resins exceeds 2 mg of KOH/g of resin granules.

According to an embodiment, the amine residual functional group content of the polyamide hot-melt resins is below 5 mg of KOH/g of resin granules.

Advantageously, one of the means enabling the polyamide hot-melt resin granules to be heated is a thermostatically-controlled mixer whose wall is heated by an oil bath or by hot water or by hot water vapor. It is understood that the polyamide hot-melt resin granules can be heated by any other equivalent heating means known to a person skilled in the art so long as its characteristics enable the desired aim of the invention to be achieved.

Advantageously, at the end of step b) of mixing the liquid solution containing the active ingredient into the hot granules, the polyamide hot-melt resin granules are substantially dry due to the fact that all of the liquid is completely absorbed.

According to another embodiment of the invention, the selection of the polyamide hot-melt resins can be performed specifically according to the titration method defined above.

According to another embodiment, there is provided a third object of the present invention which is a molded item made from a plurality of polyamide hot-melt resin granules synthesized from dimerized fatty acids having 12 to 24 carbons and diamines having 2 to 14 carbons, the granules being loaded with active ingredient, wherein the polyamide hot-melt resin granules have amine residual functional groups and acid residual functional groups in a $[NH_2]/[COOH]$ molar ratio below 5 and in a quantity of the active ingredient between 0.01 and 55%, or from about 0.1 and 55%, or from about 1 and 55%, or from about 5 and 55%, or from about 10 and 55%, or from about 15 and 55%, or from about 20 and 55%, or from about 25 and 55%, or from about 30 and 55%, or from about 35 and 55%, or from about 40 and 55%, or from about 45 and 55%, or from about 50 and 55%, or from about 0.01 and about 50%, or from about 0.1 and 50%, or from about 1 and 50%, or from about 5 and 50%, or from about 10 and 50%, or from about 15 and 50%, or from about 20 and 50%, or from about 25 and 50%, or from about 30 and 50%, or from about 35 and 50%, or from about 40 and 50%, or from about 45 and 50%, or from about 0.01 and about 45%, or from about 0.1 and 45%, or from about 1 and 45%, or from about 5 and 45%, or from about 10 and 45%, or from about 15 and 45%, or from about 20 and 45%, or from about 25 and 45%, or from about 30 and 45%, or from about 35 and 45%, or from about 40 and 45%, or from about 0.01 and about 40%, or from about 0.1 and 40%, or from about 1 and 40%, or from about 5 and 40%, or from about 10 and 40%, or from about 15 and 40%, or from about 20 and 40%, or from about 25 and 40%, or from about 30 and 40%, or from about 35 and 40%, or from about 0.01 and about 35%, or from about 0.1 and 35%, or from about 1 and 35%, or from about 5 and 35%, or from about 10 and 35%, or from about 15 and 35%, or from about 20 and 35%, or from about 25 and 35%, or from about 30 and 35%, or from about 0.01 and about 30%, or from about 0.1 and 30%, or from about 1 and 30%, or from about 5 and 30%, or from about 10 and 30%, or from about 15 and 30%, or from about 20 and 30%, or from about 25 and 30%, or from about 0.01 and about 25%, or from about 0.1 and 25%, or from about 1 and 25%, or from about 5 and 25%, or from about 10 and 25%, or from about 15 and 25%, or from about 20 and 25%, or from about 0.01 and about 20%, or from about 0.1 and 20%, or from about 1 and 20%, or from about 5 and 20%, or from about 10 and 20%, or from about 15 and 20%, or from about 0.01 and about 15%, or from about 0.1 and 15%, or from about 1 and 15%, or from about 5 and 15%, or from about 10 and 15%, or from about 0.01 and about 10%, or from about 0.1 and 10%, or from about 1 and 10%, or from about 5 and 10%, or from about 0.01 and about 5%, or from about 0.1 and 5%, or from about 1 and 5%, or from about 0.01 and about 1%, or from about 0.1 and 1%, or from about 0.01 and about 0.1%, or 0.01%, 0.1%, 1%, 5%, 10%, 15%, 20%, 25%, 30%, 35%, 40%, 45%, 50%, 55% by weight of their weight. Preferably, the resins incorporate an active ingredient in quantities of between about 1 and about 50%, or between about 5 and about 50%, or between about 10 and about 45%, or between about 15 and about 45%, or between about 20 and about 45% by weight compared to the total weight of the molded item. The item may be molded by injection-molding, blow-molding, extrusion, hot-pressing or coating.

According to an embodiment, the acid residual functional group content of the polyamide hot-melt resin exceeds 2 mg of KOH/g of resin granules, and the amine residual functional group content of the resins is below 5 mg of KOH/g of resin granules.

According to another embodiment, the hardness of the molded item of the present invention may be from about 60 to about 95 Shore A, or from about 65 to about 95 Shore A, or from about 70 to about 95 Shore A, or from about 75 to about 95 Shore A, or from about 80 to about 95 Shore A, or from about 85 to about 95 Shore A, or from about 90 to about 95 Shore A, or from about 60 to about 90 Shore A, or from about 65 to about 90 Shore A, or from about 70 to about 90 Shore A, or from about 75 to about 90 Shore A, or from about 80 to about 90 Shore A, or from about 85 to about 90 Shore A, or from about 60 to about 85 Shore A, or from about 65 to about 85 Shore A, or from about 70 to about 85 Shore A, or from about 75 to about 85 Shore A, or from about 80 to about 85 Shore A, or from about 60 to about 80 Shore A, or from about 65 to about 80 Shore A, or from about 70 to about 80 Shore A, or from about 75 to about 80 Shore A, or from about 60 to about 75 Shore A, or from about 65 to about 75 Shore A, or from about 70 to about 75 Shore A, or from about 60 to about 70 Shore A, or from about 65 to about 70 Shore A, or from about 60 to about 65 Shore A, or 60, 65, 70, 75, 80, 85, 90, or 95 Shore A.

The molded items according to the invention are specifically necklaces, bracelets, pads and patches. In another embodiment, the items may be textile materials coated with the granules loaded with active ingredients.

The active ingredient may be of natural origin or of synthetic origin. According to another embodiment, the active ingredient may have biocidal, well-being, cosmetic, therapeutic, phyto sanitary effects or properties or a mixture thereof.

According to an embodiment, the active ingredient may be a biocide chosen from an insecticide, an insect repellent, a microbicide (a bactericide, a fungicide, a virucide). According to another embodiment, the active ingredient may be selected from an attractant, a pheromone, a hormone, a vitamin, a perfume, an essential oil, a drug, a plant extract or a mixture thereof.

According to another embodiment, there is provided a fourth object of the present invention, as the use of polyamide hot-melt resin granules as defined above as a solid support incorporating between 0.01 and 55%, or from about 0.1 and 55%, or from about 1 and 55%, or from about 5 and 55%, or from about 10 and 55%, or from about 15 and 55%, or from about 20 and 55%, or from about 25 and 55%, or from about 30 and 55%, or from about 35 and 55%, or from about 40 and 55%, or from about 45 and 55%, or from about 50 and 55%, or from about 0.01 and about 50%, or from about 0.1 and 50%, or from about 1 and 50%, or from about 5 and 50%, or from about 10 and 50%, or from about 15 and 50%, or from about 20 and 50%, or from about 25 and 50%, or from about 30 and 50%, or from about 35 and 50%, or from about 40 and 50%, or from about 45 and 50%, or from about 0.01 and about 45%, or from about 0.1 and 45%, or from about 1 and 45%, or from about 5 and 45%, or from about 10 and 45%, or from about 15 and 45%, or from about 20 and 45%, or from about 25 and 45%, or from about 30 and 45%, or from about 35 and 45%, or from about 40 and 45%, or from about 0.01 and about 40%, or from about 0.1 and 40%, or from about 1 and 40%, or from about 5 and 40%, or from about 10 and 40%, or from about 15 and 40%, or from about 20 and 40%, or from about 25 and 40%, or from about 30 and 40%, or from about 35 and 40%, or from about 0.01 and about 35%, or from about 0.1 and 35%, or from about 1 and 35%, or from about 5 and 35%, or from about 10 and 35%, or from about 15 and 35%, or from about 20 and 35%, or from about 25 and 35%, or from about 30 and 35%, or from about 0.01 and about 30%, or from about 0.1 and 30%, or from about 1 and 30%, or from about 5 and 30%, or from about 10 and 30%, or from about 15 and 30%, or from about 20 and 30%, or from about 25 and 30%, or from about 0.01 and about 25%, or from about 0.1 and 25%, or from about 1 and 25%, or from about 5 and 25%, or from about 10 and 25%, or from about 15 and 25%, or from about 20 and 25%, or from about 0.01 and about 20%, or from about 0.1 and 20%, or from about 1 and 20%, or from about 5 and 20%, or from about 10 and 20%, or from about 15 and 20%, or from about 0.01 and about 15%, or from about 0.1 and 15%, or from about 1 and 15%, or from about 5 and 15%, or from about 10 and 15%, or from about 0.01 and about 10%, or from about 0.1 and 10%, or from about 1 and 10%, or from about 5 and 10%, or from about 0.01 and about 5%, or from about 0.1 and 5%, or from about 1 and 5%, or from about 0.01 and about 1%, or from about 0.1 and 1%, or from about 0.01 and about 0.1%, or 0.01%, 0.1%, 1%, 5%, 10%, 15%, 20%, 25%, 30%, 35%, 40%, 45%, 50%, 55% by weight of their weight. Preferably, the resins incorporate an active ingredient in quantities of between about 1 and about 50%, or between about 5 and about 50%, or between about 10 and about 45%, or between about 15 and about 45%, or between about 20 and about 45% by weight of a liquid solution containing an active ingredient having biocide, well-being and cosmetic, therapeutic, and phytosanitary effects or a mixture thereof.

The main advantage of the present invention is the ability to incorporate a sufficient quantity of active ingredient in the polyamide hot-melt resin granules thus allowing the control of diffusion of these active ingredients in respect of quantity and duration. In addition, the molded item obtained from granules loaded with a significant quantity of active ingredient offers more useful reserve or reservoir capacity for numerous applications and less sequestration of active ingredients.

The present invention will be more readily understood by referring to the following examples which are given to illustrate the invention rather than to limit its scope. Indeed, the method described in the present invention can perfectly well be applied to other granulometric forms of polyamide hot-melt resins, such as powders, blocks, etc.

EXAMPLE 1

Incorporation of Active Ingredient Formed by a Liquid Mixture of Essential Oils and Geraniol in Polyamide Hot-Melt Resin (PAHMR) Granules According to the Invention Before the step of incorporation of the active ingredient, a choice of hot-melt polyamide resin granules meeting the inventive criteria of the present invention is made. For this, seven types of polyamide hot-melt resins are characterized with respect to their residual functional group content (acid and amine) as well as their $[NH_2]/[COOH]$ molar ratio and softening temperature.

Among the seven polyamide hot-melt resins, three are known by the trade name TECHNOMELT®, three Uni-Rez® and one BUHNEN®. These are in the form of substantially spherical granules whose average diameter is around 3 to 4 mm. The results are set out in Table 1.

TABLE 1

Table summarizing the physico-chemical properties of different polyamide hot-melt resins granules.

| PAHMR | Trade Name | Maximum amine content (mg KOH/g of granules) | Maximum acid content (mg KOH/g of granules) | $[NH2]/[COOH]$ molar ratio |
|---|---|---|---|---|
| No 1 | TECHNOMELT PA 641 | 3 | 10 | 0.3 |
| No 2 | TECHNOMELT PA 633 | 3 | 10 | 0.3 |
| No 3 | TECHNOMELT PA 6208 | 2 | 10 | 0.2 |
| No 4 | BUHNEN C0874 | 1 | 9.9 | 0.1 |
| No 5 | UNI-REZ 2656 | 4.7 | 0.8 | 5.9 |
| No 6 | UNI-REZ 2653 | 5 | 0.5 | 10 |
| No 7 | UNI-REZ 2678 | 10 | 0.8 | 12.5 |

The active ingredient consists of a liquid mixture of essential oils, namely essential oil of peppermint and essential oil of thyme supplemented by geraniol. This active ingredient, named "S1", has an insect repellent action.

In order to proceed with the incorporation of the above-mentioned liquid active ingredient, the hot-melt polyamide resin granules referred to in Table 1 are placed in a mixer provided with an agitator, which is immersed in a bath of hot oil so as to reach the optimum temperature appropriate for the incorporation of the liquid. Then, the granules are agitated until incorporation temperature is reached. Lastly, the liquid is poured onto the hot granules, still under agitation, until it is totally incorporated.

The maximum capacity of each of the polyamide hot-melt resins to incorporate the liquid constituting the active ingredient has been assessed. The results are set out in Table 2.

TABLE 2

Table summarizing the liquid incorporation capacity of the different polyamide resins

| PAHMR | Incorporation temperature (° C.) | Maximum rate of incorporation (%) | $[NH2]/[COOH]$ molar ratio |
|---|---|---|---|
| No 1 | 65 | 41 | 0.3 |
| No 2 | 50 | 20 | 0.3 |
| No 3 | 65 | 31 | 0.2 |
| No 4 | 50 | 28 | 0.1 |

TABLE 2-continued

Table summarizing the liquid incorporation capacity of the different polyamide resins

| PAHMR | Incorporation temperature (° C.) | Maximum rate of incorporation (%) | [NH2]/[COOH] molar ratio |
|---|---|---|---|
| No 5 | 30 | 5 | 5.9 |
| No 6 | 30 | 6 | 10 |
| No 7 | 30 | 8.8 | 12.5 |
| No 8 | 45 | 9.2 | 5.9 |

Note that it is possible to incorporate up to 41% by weight of this liquid in polyamide hot-melt resin granules n° 1, compared to a rate of 8.8% by weight for polyamide hot-melt resin granules n° 7. The polyamide hot-melt resin granules n° 5 is the same as polyamide hot-melt resin granules n° 8; the difference is their incorporation temperature 30° C. and 45° C. respectively. At 45° C., these resin granules become sticky. At this temperature, they are not suitable for molding injection for example. Indeed, these sticky resin granules loaded with active ingredient are difficult, even impossible to shape.

For a better visualisation of these observations, FIG. 1 shows the influence of the [NH$_2$/COOH] molar ratio of residual functional groups on the capacity of a polyamide hot-melt resins according to the invention to incorporate liquid.

Note that polyamide hot-melt resins n° 1, 2, 3 and 4 whose [NH$_2$/COOH] molar ratios are below 2 have a maximum incorporation rate of at least 20% by weight. By contrast, polyamide hot-melt resins n° 5, 6 and 7 have a maximum liquid incorporation rate below 10% of their weight.

These results clearly show that a polyamide hot-melt resin whose [NH$_2$]/[COOH] molar ratio of residual functional groups is below 2 has the unexpected capacity to incorporate a liquid 2 to 4 times greater than that of a polyamide hot-melt resin for which this molar ratio exceeds 5.

EXAMPLE 2

Influence of the Softening Temperature of Polyamide Hot-Melt Resin Granules According to the Invention on the Capacity to Incorporate a Liquid Containing an Active Ingredient In order to confirm the results obtained in Example 1, the softening temperature of each of the polyamide hot-melt resins in Table 1 was varied. The liquid with active ingredients is identical to that of Example 1. The results are shown in FIG. 2.

Figure 2:
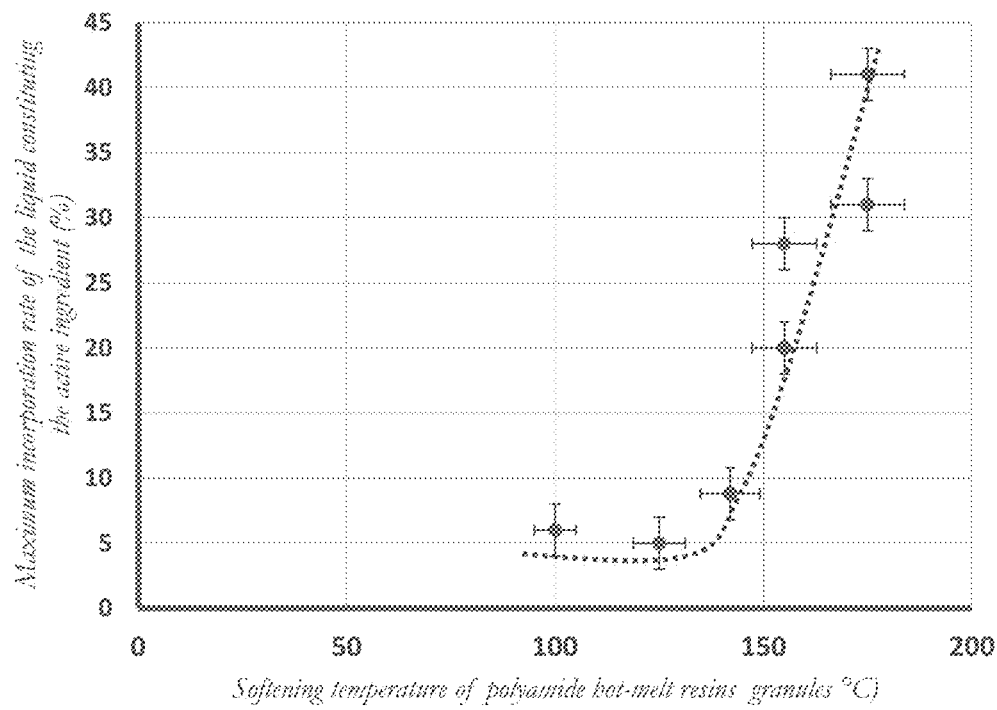
FIG. 2 illustrates the influence of the softening temperature on the capacity of polyamide hot-melt resins according to the present invention to incorporate a liquid containing an active ingredient.

FIG. 2 shows that the capacity of the polyamide hot-melt resin granules to incorporate a liquid is linked to its softening temperature. In fact, the maximum liquid incorporation rate increases with the softening temperature of the polyamide resin. Each of polyamide hot-melt resins n° 1, 2, 3 and 4 have softening temperatures of around about 170 to about 180° C., about 150 to about 160° C., about 170 to about 180° C. and about 150 to about 160° C. respectively, whereas polyamide hot-melt resins n° 5, 6, and 7 have softening temperatures of around about 120 to about 130° C., about 95 to about 105° C. and about 135 to about 150° C. respectively.

EXAMPLE 3

Influence of the Chemical Nature of the Lipophilic Liquid Constituting the Active Ingredient on the Incorporation Capacity of the Polyamide Hot-Melt Resin Granules According to the Invention To check whether the chemical nature of the liquid that constitutes the active ingredient has a significant impact on the incorporation capacity of the polyamide hot-melt resin granules, the inventors replaced the liquid "S1" of Example 1 with the "S2" consisting of a liquid mixture of essential oil of wintergreen supplemented by geraniol, all being dissolved in sweet almond oil. This active ingredient has a function that is both soothing for a human and animal subject and repellent to insects. Comparative tests were conducted on polyamide hot-melt resin granules 1 and 5. The results are provided in Table 3.

TABLE 3

Influence of the chemical nature of "S1" constituting the active ingredient

| PAHMR | Maximum incorporation rate (%) | [NH$_2$]/[COOH] molar ratio |
|---|---|---|
| No 1 | 40 | 0.3 |
| No 5 | 15 | 5.9 |

Note that polyamide hot-melt resin n° 1 still has an incorporation capacity almost 2 times greater than that of polyamide hot-melt resin n° 5 for this "S1".

Following the line of reasoning described above, "S1" was replaced with "S2" formed by the liquid mixture of essential oil of cedar and essential oil of peppermint dissolved in sweet almond oil, the polyamide resins remaining the same. This active ingredient has a function that is soothing and refreshing for a human or animal subject. The results are provided in Table 4.

TABLE 4

Influence of the chemical nature of "S2" constituting the active ingredient

| PAHMR | Maximum incorporation rate (%) | [NH$_2$]/[COOH] molar ratio |
|---|---|---|
| No 1 | 52 | 0.3 |
| No 5 | 12 | 5.9 |

Note that the polyamide hot-melt resin granules n° 1 have an incorporation capacity 5 times greater than that of polyamide hot-melt resin granules n° 5 for this "S2".

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A method for obtaining a composition comprising a polyamide hot-melt resin loaded with a diffusible active ingredient, having a chemical structure consisting of dimerized fatty acids and diamines, the polyamide hot-melt resin being able to diffuse the diffusible active ingredient, the method comprising the steps of:
(a) heating a polyamide hot-melt resin granule at about 30° C. to about 95° C., to obtain a heated polyamide hot-melt resin granule; and
(b) mixing the diffusible active ingredient with the heated polyamide hot-melt resin granule, to obtain a polyamide hot-melt resin granule loaded with the diffusible active ingredient, wherein the dimerized fatty acids have 12 to 24 carbons and the diamines have 2 to 14 carbons, wherein amine residual functional groups and acid residual functional groups within the polyamide hot-melt resin have a $[NH_2]/[COOH]$ molar ratio below 5; and wherein the polyamide hot-melt resin incorporates the active ingredient in quantities from about 0.01% to about 55% by weight of weight of the polyamide hot-melt resin.

2. The method of claim 1, wherein the polyamide hot-melt resin incorporates an active ingredient in quantities of between about 1 and about 50%, or about 5 and about 50%, or about 10 and about 45%, or about 15 and about 45%, or about 20 and about 45% by weight of weight of the polyamide hot-melt resin.

3. The method of claim 1, wherein the $[NH_2]/[COOH]$ molar ratio of the residual functional groups is below 2.

4. The method of claim 1, wherein the $[NH_2]/[COOH]$ molar ratio of the residual functional groups is below 1.

5. The method of claim 1, wherein the acid residual functional group content of the polyamide hot-melt resins exceeds 2 mg of KOH/g of resin granules.

6. The method of claim 1, wherein the amine residual functional group content of the polyamide hot-melt resins is below 5 mg of KOH/g of resin granules.

7. The method according to claim 1, wherein the diffusible active ingredient is chosen from an insecticide, an insect repellent, a microbicide, an attractant, a pheromone, a hormone, a vitamin, a perfume, an essential oil, a drug, a plant extract, or a mixture thereof.

8. The method according to claim 7, wherein the diffusible active ingredient is chosen from an essential oil, or a mixture of essential oils.

9. The method of claim 7, wherein the insecticide and the insect repellent are selected from the group consisting of pyrethroids, pyrethrines, carbamates, formamidines, carboxylic esters, N,N-diethyl-3-methylbenzamide (DEET), phenylpyrazoles, organophosphorus compounds, organohalogen compounds, neonicotinoids, avermectines, ivermectine, abamectine, doramectine, spinosyns, essential oils, terpenes, alcohol derivatives of terpenes, ester derivatives of terpenes, aldehyde derivatives of terpenes, sesquiterpenes, alcohol derivatives of sesquiterpenes, ester derivatives of sesquiterpenes, and aldehyde derivatives of sesquiterpenes.

10. The method of claim 1, wherein the amine residual functional groups and acid residual functional groups within the polyamide hot-melt resin have a $[NH_2]/[COOH]$ molar ratio below 1, the acid residual functional group content of the polyamide hot-melt resin exceeds 2 mg of KOH/g of polyamide hot-melt resin, and the amine residual functional group content of the polyamide hot-melt resin is below 5 mg of KOH/g of polyamide hot-melt resin.

11. The method of claim 1, further comprising the step:
(c) forming a molded item from a plurality of the polyamide hot-melt resin granule loaded with the diffusible active ingredient.

12. The method of claim 11, wherein the molded item is formed by injection-molding, blow-molding, extrusion, or hot-pressing or coating.

13. The method of claim 1, wherein the diffusible active ingredient is provided as a liquid solution.

\* \* \* \* \*